United States Patent [19]
Song et al.

[11] Patent Number: 6,073,246
[45] Date of Patent: Jun. 6, 2000

[54] CLOCK GENERATING APPARATUS FOR SKEW CONTROL BETWEEN TWO-PHASE NON-OVERLAPPING CLOCKS

[75] Inventors: Yoon Seok Song; Sung Sik Lee, both of Kyoungki-do, Rep. of Korea

[73] Assignee: Hyundai Electronics Industries Co., Ltd., Ichon-shi, Rep. of Korea

[21] Appl. No.: 09/106,856

[22] Filed: Jun. 30, 1998

[30] Foreign Application Priority Data

Jun. 30, 1997 [KR] Rep. of Korea ........................ 97-29638

[51] Int. Cl.[7] ........................................................ G06F 1/12
[52] U.S. Cl. ........................... 713/401; 713/503; 713/600
[58] Field of Search ................................ 713/401, 500, 713/503, 600

[56] References Cited

U.S. PATENT DOCUMENTS

| | | | |
|---|---|---|---|
| 3,745,472 | 7/1973 | Garth | 327/153 |
| 4,165,490 | 8/1979 | Howe, Jr. et al. | 327/172 |
| 5,258,660 | 11/1993 | Nelson et al. | 327/141 |
| 5,307,381 | 4/1994 | Ahuja | 375/356 |
| 5,455,931 | 10/1995 | Camporese et al. | 713/501 |
| 5,465,347 | 11/1995 | Chao et al. | 713/401 |
| 5,570,045 | 10/1996 | Erdal et al. | 326/93 |
| 5,619,157 | 4/1997 | Kumata et al. | 327/203 |

*Primary Examiner*—Dennis M. Butler
*Attorney, Agent, or Firm*—Jacobson, Price, Holman & Stern, PLLC

[57] ABSTRACT

This invention provides a clock generating apparatus that can control a skew between two-phase non-overlapping clocks in order to maintain constant non-overlapping period through an accurate analysis for the clock skew by a simple programming of delay. The invention has a delay block that receives first and second clock signals as inputs, and outputs them with delay. The invention also can control every skew in the chip and non-overlapping period of the first and the second clock signal by constituting the delay block being programmable.

6 Claims, 3 Drawing Sheets

CLOCK GENERATING APPARATUS FOR SKEW CONTROL BETWEEN TWO-PHASE NON-OVERLAPPING CLOCKS

BACKGROUND OF THE INVENTION

1. Field of the Invention

This invention relates to semiconductor integrated circuits, and more particularly, to a clock generating apparatus that controls skew between two-phase non-overlapping clocks, used as inputs of latch or flip-flop circuits.

2. Description of the Related Art

Recently, most chips are designed with synchronous circuits as a basic building block. Among them, a number of chips are using two or more non-overlapping clocks. It is common and general phenomenon that the circuit operation in a synchronous chip would not operate properly by a clock skew. Moreover when a chip is designed with a number of clocks, many problems are occur by a skew between clocks. If the skew between the two clocks is not laid within a non-overlapping period, then overlapping clock period will occur and chip will do not operate properly for this overlapping period. Thus, the accuracy of a clock skew is very important problem in chip design. In order for the most prior art to solve the clock skew problem, the important points are arranging of a hierarchical clock tree between the clock inputs of a latch or flip-flop, the destination point from the clock source, and placing and routing of each clock buffer.

However, the major disadvantage in the prior art is that the clock skew would not reduced to a satisfactory level in generating, placing and routing steps of clock tree. That is because though the total delay of the clock should be accurately considered in generating, placing and routing steps of the clock tree, but this delay much depends on clock itself, other circuit cell and geometrical shape of metal routing of other signals.

SUMMARY OF THE INVENTION

It is an object of the present invention to provide a clocking apparatus for controlling of a skew between two-phase non-overlapping clocks, and to maintain constant non-overlapping period by a simple programming of delay through an accurate analysis for the clock skew.

DETAILED DESCRIPTION OF THE INVENTION

The present invention includes two-phase non-overlapping clock generating means which generating a first and a second non-overlapping clock as outputs by input first phase clock; and a first clock tree for the first clock from the two-phase non-overlapping clock generating means; the second clock tree for the second clock from the two-phase non-overlapping clock generating means; a group of first latch/flip-flop driven by response from the first clock generated from said first clock tree, a group of the second latch/flip-flop driven by response from the second clock generated from the second clock tree. The two-phase non-overlapping clock generating means includes a delay block that receives the first and the second clock signals as inputs and outputs them with delay. By making the delay block being programmable, a total clock skew and a non-overlapping period of the first and the second clock can be controlled in a semiconductor chip.

The foregoing and other objects, features, and advantages of the invention will be apparent from the following detailed description of a preferred embodiment of the invention as illustrated in the accompanying drawings.

Figure 1:
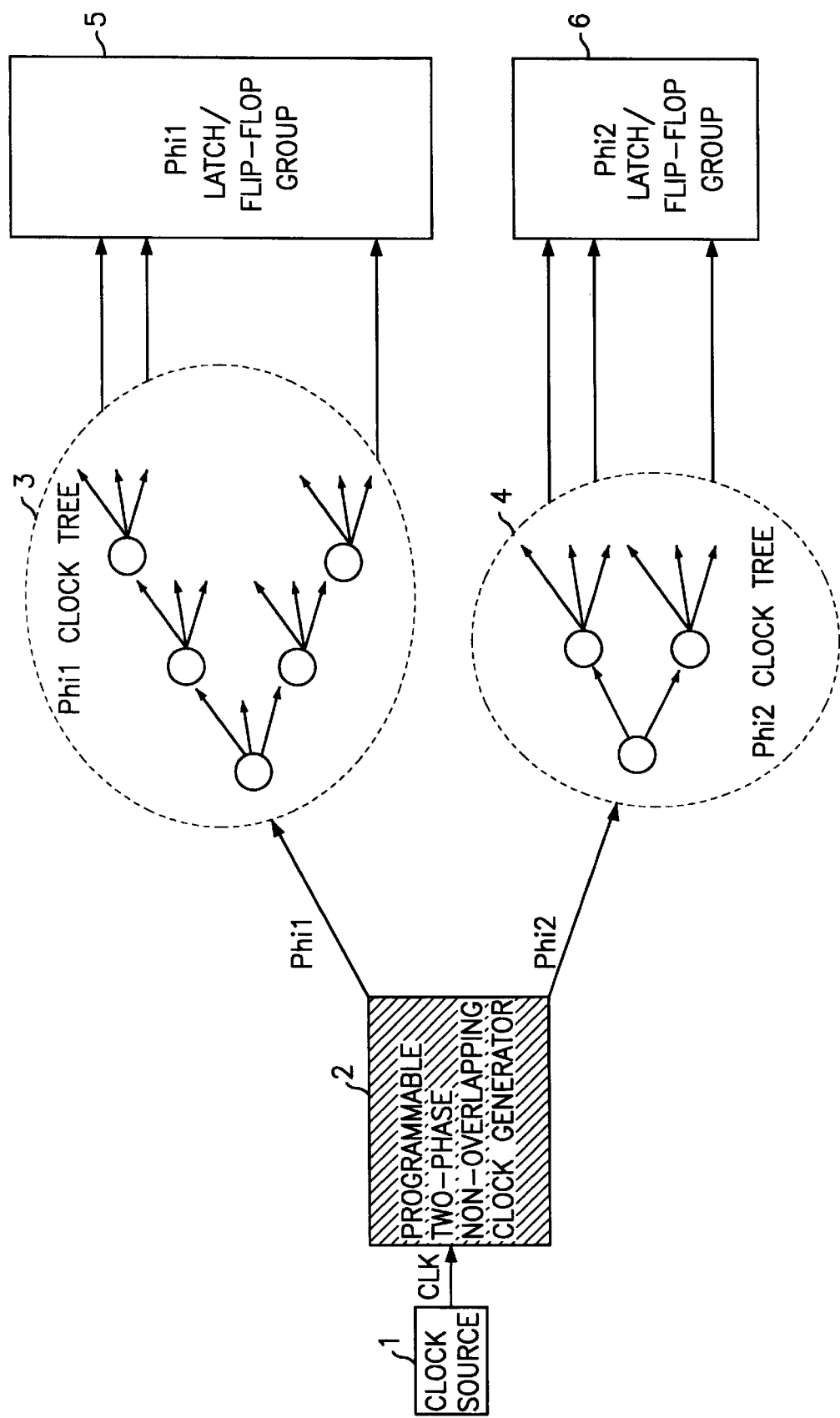
FIG. 1 is a block diagram of the present invention having two-phase non-overlapping clock generating apparatus.

A block diagram of a semiconductor apparatus in which the present invention is included is shown in FIG. 1. The first clock generating source 1, located internally or externally, generates the first phase clock signal CLK. And a programmable two-phase non-overlapping clock generator 2 receives the first phase clock as an input and outputs two-phase clocks Phi1 and Phi2. The clock tree are to make a number of clocks used in chip, which coupled to the two-phase non-overlapping clock generating means 2. And the clock trees 3, 4, are for the clocks Phi1 and Phi2 from the two-phase non-overlapping clock generating means 2. And a group 5 of a latch/flip-flop uses the clock Phi1 from the clock tree 3. And another group 6 of a latch/flip-flop uses the clock Phi2 from the other clock tree 4.

The first phase clock CLK, generated from the clock source 1, is converted to the two-phase clock Phi1 and Phi2 through the programmable two-phase non-overlapping clock generator 2. Taking account of load and delay, these two clocks Phi1 and Phi2 are inputted to the groups of a latch/flip-flop 5, 6 through the clock trees 3, 4. Relating the two clock trees 3, 4 can make a clock tree, there is no need to reduce a skew by this method because the clock tree making is done in the clock generating means 2. After the two clock trees 3, 4 were making as shown in FIG. 1, there is need to analyze skew reducing by the clock tree for each clock and difference of total delay between the two clocks. First of all, in order to know each of clock skew, the delay between the latch/flip-flops 5, which use Phi1 and Phi2 clocks from the clock generator 2, must be known or calculated. An extraction of resistance and capacitance values of metal wires from the physical layout enables this calculation. According to this calculation, we know that which delay is the longest or shortest. The difference between the longest and shortest delays will be a skew for the Phi1 clock. If one of transition edge (rising or falling) is used in the latch/flip-flops, it is enough to get one delay for that. But two edges are using, each falling or rising of delay must be acquired for different of clock tree circuits. Therefore, there are four kinds of delays for each tree. For Phi1, these are P1Rmax (Phi1 maximum rising delay), P1Rmin (Phi1 minimum falling delay), P1Fmax (Phi1 maximum falling delay), P1Fmin (Phi1 minimum falling delay). For Phi2, these are P2Rmax (Phi2 maximum rising delay), P2Rmin (Phi2 minimum falling delay), P2Fmax (Phi2 maximum failing delay), P2Fmin (Phi2 minimum falling delay).

Figure 2:
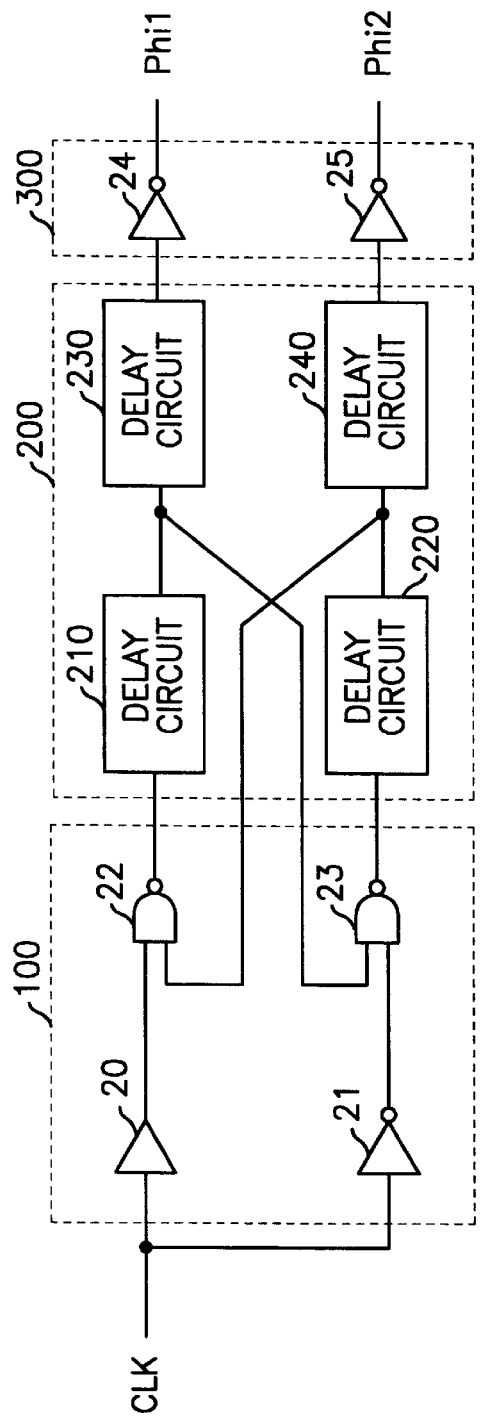
FIG. 2 is a block diagram of a two-phase non-overlapping clock generating apparatus.
Figure 4:
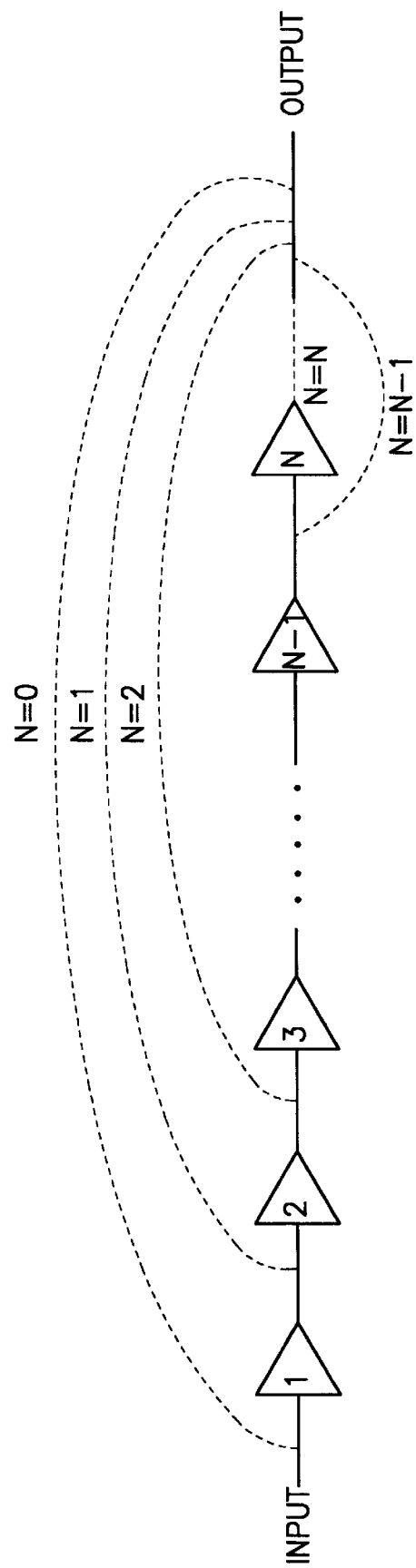
FIG. 4 depicts an internal structure of a delay circuit and its programming.

FIG. 2 is a circuit diagram of the present two-phase non-overlapping clock generator that including the programmable delay block. In order to generate the clock Phi1, the buffer 20 delays the clock input CLK which comes from the clock source 1. In order to generate the clock Phi2, the inverter 21 inverts the input clock CLK which comes from the clock source 1. From the relation between the output signal from the buffer 20 and clock Phi2, the NAND gate 22 receives the delayed feedback signal that corresponds to the non-overlapping period. A clock generating block 100 includes the first NAND gate 22, and the other NAND gate 23, which acts similarly as the first NAND gate 22. A delay block 200 delays each of output clocks from the NAND gates 22 and 23 in the clock generating block 100. An inversion block inverts the output clock, which generated from the delay block 200, and transfers Phi1, Phi2 to the clock tree 3, 4. The delay block 200 comprises, the delay circuit 210 that determines non-overlapping period between falling edge of the clock Phi2 and rising edge of the clock Phi1, and the delay circuit 220 that determines non-overlapping period between falling edge of the clock Phi1 and rising edge of the clock Phi2, and the delay circuit 230 that determines the total delay of clock (Phi1), and the delay circuit 240 that determines the total delay of clock Phi2. The above four delay circuits, as shown in FIG. 4, are made of multiples of the programmable unit delay element to compose the total delay.

According to the present invention, whole structure of the clock, generating apparatus is similar to that of conventional non-overlapping apparatus. The different point is that the length of non-overlapping period and the delay of total clock phase are controlled by a number of delay circuits in the programmable delay block. The detailed explanation of operation of the clock generating apparatus is as follows.

When the clock (CLK) moves to "1" from "0", an input of the NAND gate 23 turns to "0" by the inverter 21, and the output of the NAND gate 23 is "1". This output passes through the delay circuit 220 of the delay block 200 and the delay circuit 240, and inverted. The inverted output makes Phi2 to "0". Also the delay circuit 220 output "1" is feedback and makes the output of the NAND gate 22 to "0". As in Phi2 case, the output of the NAND gate 22 passes through the delay circuit 210 of the delay block 200 and the delay circuit 230, and also inverted. This inverted output makes Phi1 to "1". Next, the output of the delay circuit 210, "0", is feedback again and transferred to the input of the NAND gate 23, but another logic changing would not occur and the NAND gate 23 can maintain stable logic state because the other input of the NAND gate already is "0". When the clock (CLK) is change to "0" from "0", similar operation occurs as above. At this time, Phi1 falls to "0" first, and it passes feedback path, and makes Phi2 to "1". Then, the NAND gate 23 is in stable state. By the above-discussed operations, the delay circuits 230 and 240 would not interfere with each other but influence only to their own clocks, and the total delay (or phase) can be lagged or led by these delay circuits.

In order to analyze the clock skew, we arbitrary specify the delay for each part of the clock generating apparatus. First of all, assuming the inverter 21 and the buffer 20 has the same delay value, "BD". And let two NAND gates 22, 23 have the same circuit configuration and "ND" is their delay. And let the inverters 24, 25 of the inversion block 300 have the same delay value "BD1". Let each, delay circuit 210~240 have the delay values "NO1", "NO2", "PD1" and "PD2".

Figure 3:
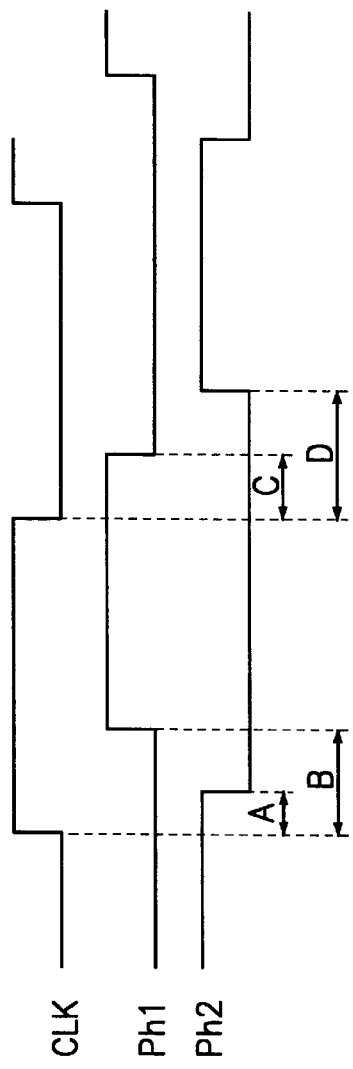
FIG. 3 shows each timing diagram of clock signal.

FIG. 3 shows a timing diagram of the clock generating apparatus, and the delay values for all the timing period shown in the figure can be formulated with delay values as follows.

A=BD+ND+NO2+PD2+BD1

B=BD+ND+NO2+ND+NO1+PD1+BD1

C=BD+ND+NO1+PD1+BD1

D=BD+ND+NO1+ND+NO2+PD2+BD1

B−A=ND+NO1+(PD1−PD2)

D−C=ND+NO2+(PD2−PD1)    (Equation 1)

There are two non-overlapping periods in two-phase non-overlapping clock. When the clock (CLK) is changing to "1" from "0", the first non-overlapping occurs between Phi2 falling period and Phi1 rising period. And when the clock (CLK) is changing to "0" from "1", the second non-overlapping occurs between Phi1 falling period and Phi2 rising period. More precisely, after the clock is change to "1", the first non-overlapping period occurs by delay difference "A" and "B". Where "A" is the delay time for Phi2 transition to "0", and "B" is the delay time for Phi1 transition to "1". As shown in equation 1, the first and the second non-overlapping period are determined by values of ND+NO1+(PD1−PD2) and ND+NO2+(PD1−PD2). Therefore, a proper programming of the delay element can make necessary length of a non-overlapping period with the exception of the delay(BD) at the inverter 21 and buffer 20.

Basically, a non-overlapping period of a two-phase clock can be prescribed by two elements. The one is the clock skew generated in whole clock design, and the other is the delay difference between the two clocks. If there is no delay difference between Phi1 and Phi2, and whole clock skew is zero in extreme case, it is not a problem that non-overlapping period near to zero. In clock designing, some skew may happen in general, it is preferable for the phase of two clocks do not have overlapped period at the last stage. To have non-overlapping period in clock design, that corresponds the maximum skew between two clocks, is the basis of the present invention. But the non-overlapping period is not lengthened infinitely due to a problem that a longer non-overlapping period accompanies by a shorter active period. Thus, in the present invention, a non-overlapping period is minimized through an analysis of the skew between two clocks.

A skew between two clocks is divided into an average of delay difference between two clocks and self-skew. A different fan-out at Phi1 and Phi2 give rise to a different number of stages and size for each clock tree. The internal delay circuits 230 and 240 of the clock generating apparatus can control this difference between the clocks. For not changing the clock duty, it is preferable to amend the skew difference by this method.

A determination of delay value (PD1, PD2) for the delay circuits 230 and 240 is given as follows.

First of all, we should get the average delay for Phi1 and Phi2 and the difference between two clocks. The average delay of active "high" period for Phi1 is given as P1avr= ((P1Rmax+P1rmin)/2+(P1Fmax +P1Fmin)/2)/2, and P2avr=((P2Rmax+P2rmin)/2+(P2Fmax+P2Fmin)/2)/2for Phi2.

Comparison of these two values can give us which clock has longer delay. If the one of the delay is shorter than the other delay, we can push the shorter clock phase forward. It is possible to program the one of the delay circuits 230 and 240 to have zero delay, and the other delay circuit to have P1avr−P2avr delay. More precisely, in P1avr>p2avr case, the delay value PD1of the circuit 230 will be programmed to zero, and the delay value of the other circuit 240 is programmed to P1avr−P2avr. In P1avr<P2avr case, the delay value PD2of the circuit 240 will be programmed to zero, and the delay value of the other circuit 230 is programmed to P1avr −P2avr. In addition, the maximum skew between two clocks can determines the delay values of the circuits 210 and 220. A non-overlapping period between falling edge of Phi2 and rising edge of Phi1 can determines the delay value NO1of the circuits 210 as shown in FIG. 3. This period should be longer than P2Fmax−P1Rmin, the maximum overlapping period made by clock skew. In other words, NO1 must satisfy the following equation 2.

ND+NO1+(PD1−PD2)>P2Fmax−P1Rmin,

NO1>(P2Fmax−P1Rmin)−(PD1−PD2)−ND    (Equation 2)

In a similar method, a non-overlapping period between falling edge of Phi1 and rising edge of Phi2 can determines the delay value NO1 of the circuit 210 as shown in FIG. 3. This period should also be longer than P1Fmax−P2Rmin, the maximum overlapping period made by clock skew. In other words, NO2 must satisfy the following-equation 3.

ND+NO2+(PD2−PD1)>P1Fmax−P2Rmin,

NO2>(P2Fmax−P2Rmin)−(PD2−PD1)−ND    (Equation 3)

Each above delay value, NO1, NO2, PD1, PD2 will be programmed to a multiple number(N) of the unit delay element (buffer). The value N. is given in equation 4 as follows.

(Equation 4)
Assuming that UD is a unit delay, and D is total delay, N satisfies

UD*(N−1)<D<−UD*N

These four PD1, PD2, NO1, NO2 are programmed internally in the clock generating apparatus, and we can get the two-phase non-overlapping clock generating apparatus which has not overlapping period between Phi1 and Phi2 in whole circuit design.

When the invention has been particularly shown and described with reference to preferred embodiments thereof, it will be understood by those skilled in the art that the foregoing and other changes in form and detail may be made therein without departing from the scope of the invention.

The major advantage of the invention is an accurate control of a non-overlapping period of two clocks. By an analysis of the skew of clock trees after the designing of two clock trees and circuit layout, we can know an accurate non-overlapping interval of two clocks, and can simply program this interval.

Another advantage of the invention is the programming that gives rise to prevent a chip from being improper operation by constant maintaining of a non-overlapping period.

Although the preferred embodiments of the invention have been disclosed for illustrative purposes, those skilled in the art will appreciate that various modifications, additions and substitutions are possible without departing from the scope and spirit of the invention as disclosed in the accompanying claims.

What is claimed is:

1. A circuit for controlling skew and non-overlapping period between two clocks, including a two-phase non-overlapping clock generator for providing a first output clock and a second output clock and receiving a first input clock; a first clock tree means for buffering said first output clock from said two-phase non-overlapping clock generator; a second clock tree means for buffering said second output clock from said two-phase non-overlapping clock generator; a first latch/flip-flop group for latching data in response to said first output clock from said first clock tree means; and a second latch/flip-flop group for latching data in response to said second output clock from said second clock tree means, wherein said two-phase non-overlapping clock generator comprises a programmable delay block for delaying and receiving said first and said second output clocks in order to control skew and non-overlapping period between said first output clock and said second clock.

2. The circuit of claim 1, wherein said programmable delay block comprises:

a first delay means for determining non-overlapping period between a falling edge of said second output clock and rising edge of said first output clock;

a second delay means for determining non-overlapping period between a falling edge of said first output clock and a rising edge of said second output clock;

a third delay means for delaying said first output clock; and a fourth delay means for delaying said second output clock.

3. The circuit of claim 2, wherein each of said first and fourth delay means comprises a plurality of unit delay element, wherein said unit delay element is programmable.

4. The circuit of claim 2, wherein said first delay means has longer delay than ((maximum delay of falling edge of said second output clock−minimum delay of rising edge of said first output clock)−(delay of said third delay means−delay of said fourth, delay means)−delay of NAND gate).

5. The circuit of claim 2, wherein said second delay means a longer delay than (maximum delay of falling edge of said first output clock−minimum delay of rising edge of said second output clock)−(delay of said fourth delay means−delay of said third output clock)−delay of NAND gate).

6. The circuit of claim 2, wherein said third delay means and said fourth delay means have zero delay or (an average delay of said first output clock−an average delay of said second output clock).

* * * * *